United States Patent [19]

McNeely

[11] 4,029,638

[45] June 14, 1977

[54] COPOLYESTER POLYMER OF ENHANCED DYEABILITY

[75] Inventor: Gerald W. McNeely, Arden, N.C.

[73] Assignee: Akzona, Asheville, N.C.

[22] Filed: Apr. 28, 1975

[21] Appl. No.: 572,025

[52] U.S. Cl. .......................... 260/75 N; 260/75 S; 428/357
[51] Int. Cl.² ........................................ C08G 63/76
[58] Field of Search ....................... 260/75 N, 75 S; 428/357

[56] References Cited

UNITED STATES PATENTS

| 2,925,404 | 2/1960 | Caldwell et al. | 260/75 N X |
| 3,528,947 | 9/1970 | Lappin et al. | 260/75 S |
| 3,856,753 | 12/1974 | Henry et al. | 260/75 N |

*Primary Examiner*—Lucille M. Phynes
*Attorney, Agent, or Firm*—Francis W. Young; Jack H. Hall

[57] ABSTRACT

Cationic dyeable copolyester polymer and yarns made therefrom having as an integral part of the polymer chain, sulfonamide groups each containing a dye sensitizing unit, derived from alkaline earth or alkali metal salts of sulfonated sulfonamides such as the sodium salt of N-(β-hydroxyethyl)-N-(3-carbomethoxybenzenesulfonyl) taurine.

29 Claims, No Drawings

COPOLYESTER POLYMER OF ENHANCED DYEABILITY

PRIOR ART

Polymeric polyesters are readily prepared by heating together dihydric alcohols and dibasic carboxylic acids or polyester-forming derivatives thereof such as acid halides or simple esters of volatile alcohols. Highly polymerized polyesters can be formed into filaments, fibers, films, and the like which can be oriented. The most widely known and most important commercially of the polymeric polyesters is that prepared by the condensation of terephthalic acid or dimethyl terephthalate and ethylene glycol. These polyester materials, in drawn fiber or filament form, cannot be satisfactorily dyed with basic or cationic dyestuffs. It is recognized that unless the fiber-forming polyesters can be readily dyed by a variety of dyestuffs, the utility of the polymer in the textile field will be limited.

Means to impart dyeability of polyester polymer in, for example, fiber, filament, or film form with basic or cationic dyestuffs without adversely affecting the physical properties of said polymer are, of course, continuously sought in the art.

Related prior art is reflected by the disclosures of U.S. Pat. Nos. 2,895,946 and 3,018,272; in the latter, linear polyesters are prepared containing from 0.5 mole percent to about 10 mole percent of a sulfonate containing dye sensitizing unit; the polymer products produced in the practice of the claimed process reflect affinity for basic type dyes and can be utilized to prepare yarns, fabrics, and other shaped articles. U.S. Pat. Nos. 3,033,824; 3,184,434; 3,313,778; and 3,528,947 represent typical prior art procedures now available.

It is well known that the dyeing of unmodified polyesters with basic dyestuffs is not practical due to their lack of affinity for this class of dyes. For this reason, polyester fibers are usually dyed with disperse dyes; a dye carrier and high temperature are required for good dyeing. However, it is sometimes difficult to obtain acceptable bright colors by this method. Therefore, the polymer industry is striving to render polyester fiber dyeable with basic dyes in order to more easily obtain these bright colors. As a result, organic sulfonic acid salts have been tested and used as modifiers to render polyester fibers dyeable with basic dyes; for example, see U.S. Pat. Nos. 3,018,272; 3,164,566; and 3,164,567. However, many of these modifiers are derivatives of monocarboxylic acids and, therefore, function as chain terminating agents when incorporated into a polyester chain. Thus, for polyester containing these mono-functional modifiers, there is a maximum obtainable molecular weight, which is determined by the concentration of the modifier. This principle of stoichiometric balance is well-known in the literature; for example, see F. W. Billmeyer, "Texbook of Polymer Science," Inter-Science Publishers (1970), at page 270.

More recently, in U.S. Pat. No. 3,856,753 by applicant's assignee, copolymer polymers of enhanced dyeability have been disclosed in which certain sulfonamides such as the sodium salt of N-methyl-N-(3,5-dicarbomethoxy)benzenesulfonyl taurine are incorporated into the polymer chain by reaction with the polyester polymer. The reaction takes place at the carbomethoxy groups, leaving the sulfonamide group as a side chain. The polymers obtained thereby are subject to yellowing during the extrusion of fibers and, therefore, represent less than a completely satisfactory solution to the dyeing problem.

DESCRIPTION OF THE INVENTION

It has now been found that polyester yarns having enhanced dyeability can be obtained by modification of the polyester chain with certain difunctional and sulfonated sulfonamide monomers. Compared to previous modified polyesters, there is a significantly lowered tendency toward yellowness in the extruded yarn. The sulfonated sulfonamide monomers react at the single carbomethoxy site and the hydroxy site, thereby forming copolymer polymers in which the sulfonamide group is directly in the chain, rather than attached as a side chain in the main polymer chain. The resulting polymers, therefore, have significantly lowered tendency to yellowness compared to the polymers as disclosed in U.S. Pat. No. 3,856,753, as determined by the Gardner color test. This result can be accomplished, for example, by using as the difunctional monomer a sulfonamide having the following structure:

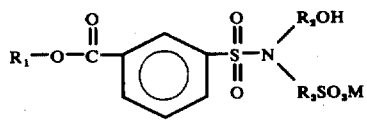

wherein $R_1$ is selected from the group consisting of H and a lower alkyl radical containing from 1 to about 4 carbons, $R_2$ and $R_3$ are alkylene radicals of from 1 to 6 carbons, and M is an alkaline earth or alkali metal. The formula of a typical polyester illustrating incorporating a comonomer dye sensitizing unit containing a sulfonamide group having the above structure as an intralinear part of the polymer chain is as follows:

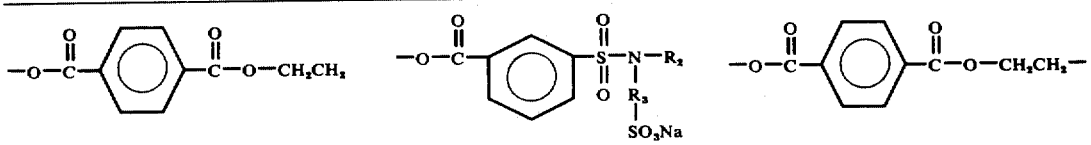

| Polyester unit | Dye sensitizing unit | Polyester unit |

PREFERRED EMBODIMENT

It is preferred, in the practice of the present invention, to utilize, as dyeing additive, from about 0.5 to about 10.0 mole percent of the sodium salt of N-($\beta$-hydroxyethyl)-N-(3-carbomethoxybenzenesulfonyl) taurine which has the formula:

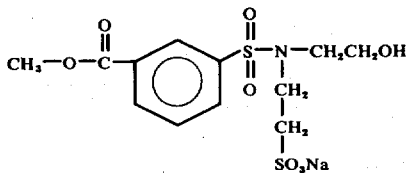

A sulfonamide having the above structure is incorporated directly into the polymer chain, for example, polyester, by adding the sulfonamide to typical polyester starting materials such as ethylene glycol and dimethyl terephthalate prior to the polymerization reaction which is carried out in a well-known manner, for example, as set forth in U.S. Pat. Nos. 3,433,780 and 3,406,152. Typical polyester materials which can be utilized include those set forth in U.S. Pat. Nos. 2,465,319; 2,437,232; 2,895,946; and 3,018,272.

Various other additives can be added to the reaction mixture, i.e., polymer melt, such as flame retardants, antistats, ester interchange catalysts as salts of calcium, manganese, or lanthanum, and, such polymerization catalysts as antimony oxide will usually be present. Color inhibitors, such as alkyl or aryl phosphate esters can also be used. In addition, pigments, delusterants, or other additives can be present, such as titanium or barium carbonate.

The monomers are preferably reacted in contact with a suitable catalyst in order to shorten the reaction period and thus lessen the possibility of discoloriation. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanium silicate, and the like. The concentration of the catalyst can be varied from about 0.001 percent to about 1.0 percent by weight of the total amount of dicarboxylic acid compounds charged. A preferred amount is from about 0.005 percent to about 0.5 percent by weight, with the most preferred amount being from about 0.01 percent to about 0.2 percent by weight.

Yarns produced in the practice of the present invention reflect enhanced basic and disperse dye receptiveness and improved basic dye light fastness properties; they are suitable for the usual textile applications and can be employed in the knitting or weaving of fabrics of all types as well as in the production of non-woven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which can be applied in accordance with the present invention can be mentioned Victoria Green WB (C.I. 657); Rhodamine B (C.I. 749); Brilliant Green B (C.I. 662); Victoria Pure Blue BO (pr. 198); and the like. The dyes are preferably applied from an aqueous solution, with or without carrier, at a temperature between about 100° and 125° C.

Among the basic and disperse dyestuffs which readily dye the fibers produced from the copolyesters of this invention are the "Genacryl" and "Celliton" dyes discussed on pages 432 to 433 of the American Dyestuff Reportor, Volume 43, 1954, and the like.

Typical dyestuffs which can be utilized include the following:

| | |
|---|---|
| Sevron Yellow R | Basic Yellow 11 |
| Astrazon Yellow 7 GLL | Basic Yellow 21 |
| Sevron Orange G | Basic Orange 21 |
| Maxilon Red BL | Basic Red 22 |
| Astrazon Red BBL | Basic Red 23 |
| Astrazon Red RL | Basic Red 25 |
| Sevron Red GL | Basic Red 18 |
| Sevron Blue ER | Basic Blue |
| Sevron Blue 5G | Basic Blue 4 |
| Sevron Blue BGL | Basic Blue 35 |
| Sevron Blue NF | Basic Blue |
| Resolin Blue FBLD | Disperse Blue 56 |
| Sevron Brilliant Red D | Basic Red 19 |

To obtain the modified polyesters of this invention, the modifier may simply be added directly to the reaction mixture from which the polyester will be made. Thus, these modifiers can be used as a component monomer in the original polyester reaction mixture. This mixture is then reacted to form the polyester from which fibers can be spun. The methods and details thereof by which these steps are carried out are well known to the polyester industry and, therefore, need not be specifically set forth in this text.

The novel product of this invention is a copolyester polymer, the molecular chains of which consist essentially of alkylene terephthalate or isophthalate segments and as an essential component a minor amount of a sulfonamide comonomer reactant of the formula:

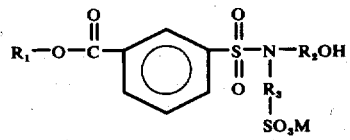

wherein $R_1$ is selected from the group consisting of H and a lower alkyl radical containing from 1 to about 4 carbons; $R_2$ and $R_3$ are alkylene radicals of from 1 to about 6 carbons; and M is selected from a group consisting of alkaline earth and alkali metals, preferably Li, Na, or K. The composition of said polyester is such as to provide therein between 0.5 and 10 mole percent of the sulfonamide comonomer reactant, the preferred range being 0.5 to 5.0 mole percent. The alkylene terephthalate segments may also be replaced in part by alkylene diacids or diesters thereof, for example, dimethyl azelate, the substitution ranging up to about 10 mole percent.

A convenient method for preparing the copolyester polymers of this invention involves the blending together of the aromatic diacid or diester thereof, the alkylene diol, and the sulfonamide comonomer reactant, and stirring while heating up to 230° C. in an inert atmosphere. This is followed by heating up to 300° C. under reduced pressure for the period of time required for the desired molecular weight. It is advantageous to employ catalysts to accelerate the reaction rates. Manganous benzoate and calcium acetate are suitable ester interchange catalysts while antimony trioxide and antimony tributylate have been found to be effective polycondensation catalysts.

Representative examples illustrating this invention follow.

EXAMPLE I

N-(β-hydroxyethyl)-2-aminoethanesulfonic acid,

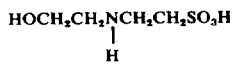

was prepared as follows: 2250 parts water was saturated with sulfur dioxide at 10° C. in a three-necked, round-bottom flask which was fitted with an electrical stirrer, thermometer, dropping funnel, and a gas inlet tube, 261 parts 1-aziridine-ethanol dissolved in 750 parts water was added via the dropping funnel while sulfur dioxide was bubbled into the flask and the temperature maintained at 10° C. After the addition was completed, the contents of the flask were concentrated to 600 parts and added to 3000 parts ethanol (F-30). The resulting solid was washed with 2000 parts ethanol, filtered, and dried to give 340 parts of the desired product.

EXAMPLE II

The sodium salt of N-(β-hydroxyethyl)-N-(3-carbomethoxybenzensulfonyl) taurine,

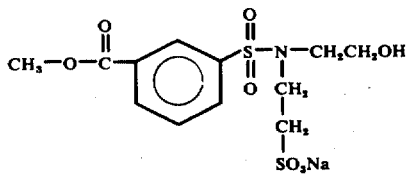

was prepared as follows: 253.5 parts of the N-(β-hydroxyethyl)-2-aminoethanesulfonic acid, prepared as in Example I, 60.0 parts 5.92 N sodium hydroxide, 79.5 parts sodium carbonate, 875 parts water, and 200 parts acetone were placed in a three-necked, round-bottom flask which was fitted with a stirring rod, thermometer and dropping funnel. 352 parts methyl benzoate-3-sulfonyl chloride dissolved in 1300 parts acetone were added via the dropping funnel at such a rate that the flask temperature did not increase above 40° C. After the addition was completed, two hours, the resulting slurry was stirred for 2 hours, concentrated to 1600 parts, then added to 5000 parts isopropyl alcohol. This slurry was cooled to 10° C. and filtered to give 506 parts of the desired product after drying under reduced pressure at 70° C.

EXAMPLE III 4.32 parts of the sodium salt of N-(β-hydroxyethyl)-N-(3-carbomethoxybenzenesulfonyl) taurine prepared according to Example II were added to 108 parts of dimethyl terephthalate, 81 parts of ethylene glycol, 0.364 part of manganous benzoate, and 0.110 part of calcium acetate, the ratio of the added comonomer to dimethyl terephthalate being about 2.0 mole percent. The mixture was heated for 2 hours in a nitrogen atmosphere, the temperature rising to 200° C. with evolution of methanol, 0.0864 part of antimony tributylate and 0.351 part of the glycol ester of phosphoric acid were added and the pressure then reduced to 0.1 mm. of mercury and the temperature was increased to 270° C. After 1.6 hours, a polymer was obtained having an intrinsic viscosity of 0.49.

The Gardner b value, a measure of polymer yellowness, was 4.8 determined on polymer at the beginning of the extrusion and 6.0 at the end of the extrusion.

This compares with a Gardner b value of 7.0 determined on a polymer at the beginning of the extrusion and 10.7 at the end of the extrusion which was prepared according to the preferred embodiment of U.S. Pat. No. 3,856,753 by incorporating the sodium salt of N-methyl-N-(3,5-dicarbomethoxy)benzenesulfonyl taurine into a polyester polymer. The improved color of the copolyester polymer of the present invention demonstrates the effect of incorporating the sulfonamide group directly in the polymer chain rather than having the sulfonamide group as a side chain.

The polymer according to the present invention was spun and drawn as yarn of 70 denier, 32 filaments (70/32 yarn) which had the following properties:

Intrinsic viscosity: 0.49
Tenacity, gms./denier: 3.41
Breaking elongation, %: 25.4
Meq. COOM/Kg.: 60

The yarn exhibited good thermal and light stability having 81.3% retained tenacity after being heated at 180° C. for 120 minutes and 91.3% retained tenacity after being exposed in a Fade-Ometer for 160 hours. Knit tubes prepared from this yarn were dyed in separate-but-equal dyebaths with 1.0% percent (owf.) of each of the following dyes:

1. Astrazon Red BBL — Basic Red 23
2. Sevron Orange G — Basic Orange 21
3. Resolin Blue FBLD — Disperse Blue 56

The final dyebath exhaustions were measured spectrophotometrically and the percent exhaustion was better than 90 percent for each basic dyestuff. IIIA AATCC wash tests at 160° F. and lightfastness tests in the Carbon-Arc Fade-Ometer at 10, 20 and 40 hours exposure were performed on each dyed sample and fair to excellent ratings were obtained.

EXAMPLE IV

N-(β-hydroxyethyl)-3-aminopropanesulfonic acid,

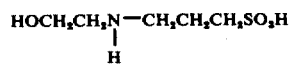

was prepared as follows: 366 parts ethanolamine and 1000 parts methanol were cooled to 10° C. in a three-necked, round-bottom flask which was fitted with a stirring bar, thermometer, and a dropping funnel. 244 parts propane sultone dissolved in 1000 parts methanol were added via the dropping funnel at such a rate that the flask temperature did not increase above 20° C. After the addition was completed, the contents of the flask were stirred for 2 hours, concentrated to a thick slurry, and then added to 2400 parts isopropyl alcohol. The resulting solid was filtered, rinsed with 500 parts isopropyl alcohol and dried to give 240 parts of the desired product.

EXAMPLE V

The sodium salt of N-(β-hydroxyethyl)-N-(ν-sulfopropyl)-3-carbomethoxybenzenesulfonamide,

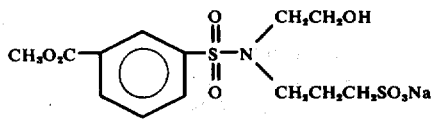

was prepared as follows: 109.8 parts N-(β-hydroxyethyl)-3-aminopropane-sulfonic acid, prepared as in Example IV, 24.0 parts 5.92 N sodium hydroxide, and approximately 100 parts water were placed in a three-necked, round-bottom flask which was fitted with an electrical stirrer, thermometer, and a dropping funnel. 70.4 parts methyl benzoate-3-sulfonyl chloride dissolved in 200 parts acetone were added via the dropping funnel at such a rate that the flask temperature did not increase above 10° C. After the addition was completed, a white solid was filtered from the contents of the flask. This solid was recrystallized twice from a 10% solution in 80:20 isopropyl alcohol:water, then dried under reduced pressure to give approximately 95 parts of the desired product.

EXAMPLE VI 12.4 parts of the sodium salt of N-(β-hydroxyethyl)-N-(ν-sulfopropyl)-3-carbomethoxybenzenesulfonamide prepared according to Example V were added to 294 parts of dimethyl terephthalate, 216 parts of ethylene glycol, 0.262 part of manganous benzoate, the ratio of the sulfonamide comonomer to dimethyl terephthalate being about 2.0 mole percent. The mixture was heated for 1 hour, in a nitrogen atmosphere, the temperature rising to 220° C. with evolution of methanol. 0.306 part of the antimony tributylate and 0.994 part of trimethyl phosphate were added and the pressure reduced to 0.1 mm. of mercury and the temperature increased to 265° C. After 1 hour, a polymer was obtained having an intrinsic viscosity of 0.50. The Gardner b value, a measure of polymer yellowness, was 3.7 determined on another sample of polymer prepared in a similar manner at the beginning of the extrusion and 6.1 at the end of the extrusion. This polymer was spun and drawn as 30/6 yarn which had the following properties:

Intrinsic viscosity: 0.42
Tenacity, gms./denier: 3.41
Breaking elongation, %: 20.3
Meq. COOH/kg.: 104

The yarn exhibited good thermal and light stability having 50.4 percent retained tenacity after being heated at 220° C. for 120 minutes and 85.0 percent retained tenacity after being exposed in a Fade-Ometer for 80 hours. Knit tubes prepared from this yarn were dyed in separate-but-equal dyebaths with 1.0 percent (owf.) of each of the following dyes:

1. Astrazon Red BBL — Basic Red 23
2. Servron Orange G — Basic Orange 21
3. Resolin Blue FBLD — Disperse Blue 56

The final dyebath exhaustions were measured spectrophotometrically and the percent exhaustion was better than 90 percent for each basic dyestuff. IIIA AATCC wash tests at 160° F. and lightfastness tests in the Carbon-Arc Fade-Ometer at 10, 20 and 40 hours exposure were performed on each dyed sample and good to excellent ratings were obtained.

EXAMPLE VII

N-(ν-hydroxypropyl)-3-aminopropanesulfonic acid,

was prepared as follows: 150 parts of 3-amino-1-propanol and 2500 parts methanol were placed in a three-necked, round-bottom flask which was fitted with a stirrer, thermometer, and a dropping funnel. 244 parts propane sultone dissolved in 1000 parts methanol were added via the dropping funnel at such a rate that the flask temperature did not increase above 30° C. After the addition was completed, the contents of the flask were stirred for 3 hours, filtered, and dried to give 136 parts of the desired product.

EXAMPLE VIII

The sodium salt of N-(ν-hydroxypropyl)-N-(ν-sulfopropyl)-3-carbomethoxybenzensulfonamide

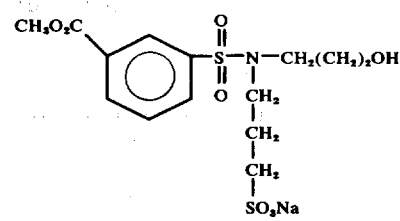

was prepared as follows: 134.0 parts N-(ν-hydroxypropyl)-3-aminopropanesulfonic acid prepared as in Example VII, 27.2 parts 5.92 N sodium hydroxide, 36.1 parts sodium carbonate, and 402.4 parts water were placed in a three-necked, round-bottom flask which was fitted with a stirring rod, thermometer, and dropping funnel. 159.5 parts methyl benzoate-3-sulfonyl chloride dissolved in 500 parts acetone were added via the dropping funnel at such a rate that the flask temperature did not increase above 25° C. After the addition was completed, the contents of the flask were stirred for 2 hours, filtered, and poured into 4800 parts acetone. This mixture was filtered and the filtrate evaporated to 370 parts. The resulting slurry was added to 3000 parts isopropyl alcohol and filtered. This solid was slurried in 3000 parts acetone, filtered, and dried under reduced pressure to give 186 parts of the desired product.

EXAMPLE IX 12.9 parts of the sodium salt of N-(ν-hydroxypropyl)-N-(ν-sulfopropyl)-3-carbomethoxybenzenesulfonamide prepared according to Example VIII were added to 294 parts of dimethyl terephthalate, 241 parts of ethylene glycol, 0.262 part of manganous benzoate, the ratio of the sulfonamide comonomer to dimethyl terephthalate being about 2.0 mole percent. The mixture was heated for 1 hour, in a nitrogen atmosphere, the temperature rising to 220° C. for evolution of methanol. 0.306 part of antimony tributylate and 0.994 part of trimethyl phosphate were added and pressure reduced to 0.1 mm. of mercury and the temperature increased to 265° C. After one hour, a polymer was obtained having an intrinsic viscosity of 0.46. This polymer was spun and drawn as 30/6 yarn which had the following properties:

Intrinsic viscosity: 0.39
Tenacity, gms./denier: 2.85
Breaking elongation, %: 35.0
Meq. COOH/kg.: 78

The yarn exhibited good thermal and light stability having 53.0 percent retained tenacity after being heated at 220° C. for 120 minutes and 86.7 percent retained tenacity after being exposed in a Fade-Ometer for 80 hours. Knit tubes prepared from this yarn were dyed in separate-but-equal dyebaths with 1.0 percent (owf.) of each of the following dyes:

1. Astrazon Red BBL — Basic Red 23
2. Sevron Orange G — Basic Orange 21
3. Resolin Blue FBLD — Disperse Blue 56

The final dyebath exhaustions were measured spectrophotometrically and the percent exhaustion was better than 90 percent for each basic dyestuff. IIIA AATCC wash tests at 160° F. and lightfastness tests in the Carbon-Arc Fade-Ometer at 10, 20 and 40 hours exposure were performed on each dyed sample and good to excellent ratings were obtained.

EXAMPLE X

N-(6-hydroxyethyl)-3-aminopropanesulfonic acid,

was prepared as follows: 117.2 parts 6-amino-1-hexanol and 800 parts methanol were placed in a three-necked, round-bottom flask which was fitted with a stirrer, thermometer, and a dropping funnel. 122.2 parts of propane sultone dissolved in 600 parts methanol were added via the dropping funnel. After the addition was completed, the contents of the flask were stirred at 25–30° C. for 3 hours, then filtered. The filtrate was concentrated to 400 parts and added to 2000 parts ethanol (F-30). The resultant solid was filtered, combined with the first solid, washed with acetone, and dried to give 112 parts of the desired product.

EXAMPLE XI

The sodium salt of N-(6-hydroxyhexyl)-N-($\nu$-sulfopropyl)-3-carbomethoxybenzenesulfonamide,

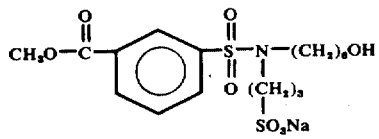

was prepared as follows: 239 parts of N-(6-hydroxyhexyl3-amino-propanesulfonic acid, prepared as in Example X, 169 parts 5.92 N sodium hydroxide, 53 parts sodium carbonate, and 150 parts acetone were placed in a three-necked, round-bottom flask which was fitted with a stirrer, thermometer, and dropping funnel. 234.5 parts of methyl benzoate-3-sulfonyl chloride dissolved in 350 parts acetone were added via the dropping funnel between 30 and 35° C. After the addition was completed, the contents of the flask were then evaporated to dryness and the resulting solid recrystallized from methanol and isopropyl alcohol to give 155 parts of the desired product.

EXAMPLE XII 14.2 parts of the sodium salt of N-(6-hydroxyhexyl)-N-($\nu$-sulfopropyl)-3-carbomethoxybenzenesulfonamide prepared according to Example XI were added to 294 parts of dimethyl terephthalate, 241 parts of ethylene glycol, 0.262 part of manganous benzoate, the ratio of the sulfonamide comonomer to dimethyl terephthalate being about 2.0 mole percent. The mixture was heated for 1 hour, in a nitrogen atmosphere, the temperature rising to 220° C. with evolution of methanol. 0.306 part of antimony tributylate and 0.994 part of trimethyl phosphate were added and the pressure reduced to 0.1 mm. of mercury and the temperature increased to 265° C. After 1 hour, a polymer was obtained having an intrinsic viscosity of 0.38. This polymer was spun and drawn as 30/6 yarn which had the following properties:

Intrinsic viscosity: 0.31
Tenacity, gms./denier: 3.34
Breaking elongation, %: 50.6
Meq. COOH/kg.: 81

Knit tubes prepared from this yarn were dyed in separate-but-equal dyebaths with 1.0 percent (owf.) of each of the following dyes:

1. Astrazone Red BBL — Basic Red 23
2. Sevron Orange G — Basic Orange 21
3. Resolin Blue FBLD — Disperse Blue 56

The final dyebath exhaustions were measured spectro-photometrically and the precent exhaustion was better than 90 percent for each basic dyestuff. IIIA AATCC wash tests at 160° F. and lightfastness tests in the Carbon-Arc Fade-Ometer at 10, 20 and 40 hours exposure were performed on each dyed sample, and good to excellent ratings were otained.

In the preceding representative examples, the particular metal salts can be routinely varied, within the context of this specification as understood by one skilled in the art to produce different species thereof and then said species utilized to achieve substantially the same results.

The $R_1$ radicals of our dye sensitizing unit can be H or lower alkyl of from 1 to 4 carbon atoms; the methoxy derivative is preferred to minimize process contamination from alcohol given off during polymerization.

The sulfonammide comonomeric dye sensitizing reactant containing a sulfonate group should, for best results, be of reasonable purity to insure the preparation of fully processable and dyeable copolymer polymer; this requirement can be readily met by one skilled in the art with a minimum of routine analysis and experimentation. Said reactant must, of course, also be sufficiently heat stable to perform effectively as a dye sensitizing unit and to avoid polymer degradation.

This invention provides the textile art with novel and improved modified polyesters, which modified polyesters retain the physical properties required, for example, for filaments thereof utilized in textile applications; are readily dyed by conventional techniques with the class of dyes known as basic or cationic dyestuffs to deep and useful shades of color; and have a significantly lowered lowered tendency to yellowness in the extruded yarn compared to previous modified polyesters.

The preceding representative Examples can be varied as to select component and amounts within the skill of one versed in the art to achieve substantially the same results. Such equivalent modifications are fully within the inventive concept set forth as herein described and claimed.

What is claimed is:

1. Copolyester polymer consisting essentially of segments selected from the group consisting of alkylene terephthalate and alkylene isophthalate and containing units derived from about 0.5 to about 10 mole percent sulfonamide comonomer dye sensitizing reactant having the formula:

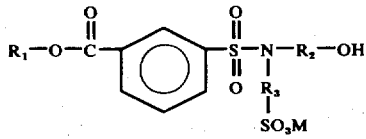

wherein $R_1$ is selected from the group consisting of H and a lower alkyl radical containing from 1 to about 4 carbons; $R_2$ is an alkylene radical of from 1 to about 6 carbons; $R_3$ is an alkylene radical of from 1 to 6 carbons; and M is selected from the group consisting of alkaline earth and alkali metals.

2. Copolyester polymer of claim 1 wherein $R_1$ is methyl, and $R_2$ and $R_3$ are ethyl.

3. Copolyester polymer according to claim 2 wherein M of said dye sensitizing reactant in Na.

4. Cationic dyeable fiber forming copolyester polymer consisting essentially of segments selected from the group consisting of alkylene terephthalate and alkylene isophthalate and containing units derived from about 0.5 to about 5 mole percent sulfonamide comonomer dye sensitizing reactants containing sulfonamide groups as a repeating intralinear part of the polymer chain, said dye sensitizing reactant having the formula:

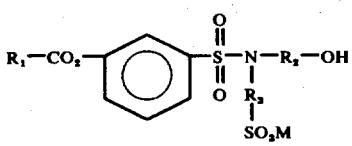

wherein $R_1$ is selected from the group consisting of H and a lower alkyl radical of from 1 to about 4 carbons; $R_2$ is an alkylene radical of from 1 to about 6 carbons; $R_3$ is an alkylene radical of from 1 to 6 carbons; and M is selected from the group consisting of alkaline earth and alkali metals.

5. The cationic dyeable fiber forming copolyester polymer of claim 4 wherein $R_1$ is methyl, and $R_2$ and $R_3$ are ethyl.

6. Copolyester polymer according to claim 5 wherein M of said dye sensitizing reactant is Na.

7. The cationic dyeable fiber forming copolyester polymer of claim 4 wherein $R_1$ is methyl, $R_2$ is ethyl, and $R_3$ is propyl.

8. Copolyester polymer according to claim 7 wherein M of said dye sensitizing reactant is Na.

9. The cationic dyeable fiber forming copolymer polymer of claim 4 wherein $R_1$ is methyl, and $R_2$ and $R_3$ are propyl.

10. Copolyester polymer according to claim 9 wherein M of said dye sensitizing reactant is Na.

11. Cationic dyeable fiber forming copolyester polymer of claim 4 wherein $R_1$ is methyl, $R_2$ is hexyl, and $R_3$ is propyl.

12. Copolyester polymer according to claim 11 wherein M of said dye sensitizing reactant is Na.

13. Copolyester polymer having from about 0.5 to about 10 mole percent comonomer dye sensitizing units containing sulfonamide groups as an intralinear part of the polymer chain, said copolyester having the formula:

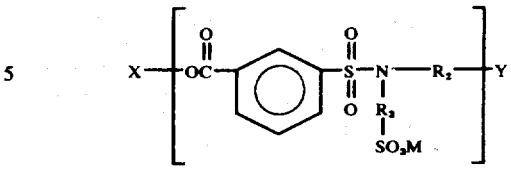

wherein $R_2$ and $R_3$ are alkylene radicals of from 1 to about 6 carbons, M is selected from the group consisting of alkaline earth metals and alkali metals, X is a radical remaining after the removal of a hydroxyl group from a polyester unit and Y is a radical remaining after the removal of a hydrogen atom from a carboxyl group of a polyester unit.

14. Copolyester polymer of claim 13 where $R_2$ and $R_3$ are ethyl.

15. Copolyester polymer of claim 14 wherein M of said dye sensitizing unit is Na.

16. Copolyester polymer of claim 13 wherein $R_2$ is ethyl and $R_3$ is propyl.

17. Copolyester polymer of claim 16 wherein M of said dye sensitizing unit is Na.

18. Copolyester polymer of claim 13 wherein $R_2$ and $R_3$ are propyl.

19. Copolyester polymer of claim 18 wherein M of said dye sensitizing unit is Na.

20. Copolyester polymer of claim 13 wherein $R_2$ is hexyl and $R_3$ is propyl.

21. Copolyester polymer of claim 20 wherein M of said dye sensitizing unit is Na.

22. Cationic dyeable yarn comprising copolyester polymer consisting essentially of segments selected from the group consisting of alkylene terephthalate and alkylene isophthalate and containing units derived from about 0.5 to about 10 mole percent sulfonamide comonomer dye sensitizing reactant having the formula:

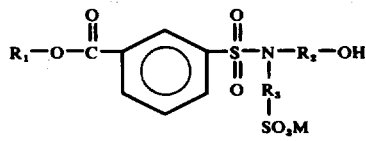

wherein $R_1$ is selected from the group consisting of H and a lower alkyl radical of from 1 to about 4 carbons; $R_2$ is an alkylene radical of from 1 to about 6 carbons; $R_3$ is an alkylene radical of from 1 to 6 carbons; and M is selected from the group consisting of alkaline earth and alkali metals.

23. Cationic dyeable yarn of claim 22 wherein said mole percent of sulfonamide comonomer dye sensitizing units is from about 0.5 to about 5 mole percent.

24. Cationic dyeable yarn of claim 23 wherein $R_1$ is methyl; $R_2$ and $R_3$ are ethyl; and M is Na.

25. Cationic dyeable yarn comprising a copolyester polymer having from about 0.5 to about 5 mole percent comonomer dye sensitizing units containing sulfonamide groups as an intralinear part of the polymer chain, said copolyester polymer having the formula:

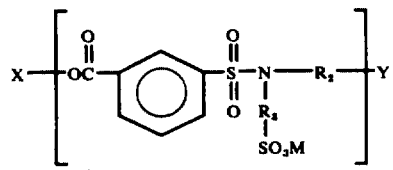

wherein $R_2$ and $R_3$ are alkylene radicals of from 1 to about 6 carbons, M is selected from the group consisting of alkaline earth metals and alkali metals, X is a radical remaining after the removal of a hydroxyl group from a polyester unit and Y is a radical remaining after the removal of a hydrogen atom from a carboxyl group of a polyester unit.

26. Cationic dyeable yarn of claim 25 wherein $R_2$ and $R_3$ are ethyl and M is Na.

27. Cationic dyeable yarn of claim 25 wherein $R_2$ is ethyl; $R_3$ is propyl; and M is Na.

28. Cationic dyeable yarn of claim 25 wherein $R_2$ and $R_3$ are propyl; and M is Na.

29. Cationic dyeable yarn of claim 25 wherein $R_2$ is hexyl; $R_3$ is propyl; and M is Na.